United States Patent
Yan et al.

(10) Patent No.: US 12,246,301 B2
(45) Date of Patent: Mar. 11, 2025

(54) SOLID AMINE MATERIAL ABSORBING CARBON DIOXIDE, PREPARATION METHOD AND APPLICATION THEREOF

(71) Applicant: DeCarbon Technology (Shenzhen) Co., Ltd, Guangdong (CN)

(72) Inventors: Feng Yan, Guangdong (CN); Xiong Peng, Guangdong (CN); Jiyun Xu, Guangdong (CN); Zuotai Zhang, Guangdong (CN)

(73) Assignee: DeCarbon Technology (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 18/606,239

(22) Filed: Mar. 15, 2024

(65) Prior Publication Data

US 2025/0018366 A1    Jan. 16, 2025

(30) Foreign Application Priority Data

Jul. 12, 2023    (CN) .......................... 202310851448.3

(51) Int. Cl.
| | |
|---|---|
| *B01J 20/22* | (2006.01) |
| *B01D 53/62* | (2006.01) |
| *B01D 53/81* | (2006.01) |
| *B01J 20/10* | (2006.01) |
| *B01J 20/32* | (2006.01) |

(52) U.S. Cl.
CPC .............. *B01J 20/22* (2013.01); *B01D 53/62* (2013.01); *B01D 53/81* (2013.01); *B01J 20/103* (2013.01); *B01J 20/3204* (2013.01); *B01J 20/3225* (2013.01); *B01J 20/3287* (2013.01); *B01D 2253/20* (2013.01); *B01D 2257/504* (2013.01); *B01D 2258/0283* (2013.01)

(58) Field of Classification Search
CPC ...... B01J 20/22; B01J 20/103; B01J 20/3204; B01J 20/3224; B01J 20/3287; B01D 53/62; B01D 53/81; B01D 2253/20; B01D 2257/504
See application file for complete search history.

(56) References Cited

FOREIGN PATENT DOCUMENTS

| | | | | |
|---|---|---|---|---|
| CN | 103418356 A | 12/2013 | | |
| CN | 108554384 A | 9/2018 | | |
| CN | 111097368 A | 5/2020 | | |
| CN | 114192122 A | 3/2022 | | |
| CN | 114437366 A | * 5/2022 | .............. | C07H 1/00 |
| CN | 115779860 A | 3/2023 | | |
| WO | 2022172490 A1 | 8/2022 | | |

* cited by examiner

*Primary Examiner* — Daniel Berns

(57) ABSTRACT

The present disclosure discloses a solid amine material absorbing $CO_2$, preparation method, and application thereof, including a porous carrier and water-resistant organic amine loaded on the porous carrier. The water-resistant organic amine includes a biomass-derived polyhydroxyl compound, hydrophilic organic amine and hydrophobic organic amine combined with the biomass-derived polyhydroxyl compound at the same time. The biomass-derived polyhydroxyl compound comprises a six-membered ring structure, with good water resistance and $CO_2$ adsorption effect.

3 Claims, 1 Drawing Sheet

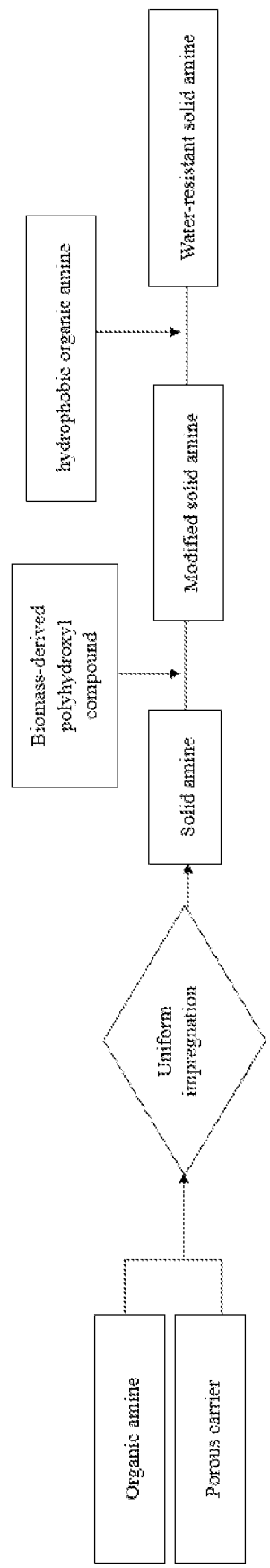

SOLID AMINE MATERIAL ABSORBING CARBON DIOXIDE, PREPARATION METHOD AND APPLICATION THEREOF

CROSS-REFERENCE TO RELATED APPLICATION

This application claims priorities from the Chinese patent application 2023108514483 filed Jul. 12, 2023, the content of which is incorporated herein in the entirety by reference.

TECHNICAL FIELD

The present disclosure relates to the technical field of carbon capture, in particular to a solid amine material absorbing $CO_2$, preparation method and application thereof.

BACKGROUND $CO_2$ is one of the main greenhouse gases related to climate change and fossil fuel burning is the primary source that causes an increase in $CO_2$ emission concentration in the atmosphere.

$CO_2$ adsorption is a new carbon capture technology, with advantages of high adsorption capacity, strong adsorption selectivity, easy preparation of materials, mild operating conditions, and potential low energy consumption. The solid amine adsorption material prepared by the porous solid material loaded with the hydrophilic organic amine has been widely used for $CO_2$ adsorption in air, industrial flue gas, natural gas, and ship exhaust. The solid amine exhibits better adsorbability in pure $CO_2$ or two-component gas. However, the actual flue gas from power plants contains a lot of water vapor; On the one hand, water molecules will reduce the adsorbability of the material towards $CO_2$ because of competition for active sites. On the other hand, water vapor is easy to cause the agglomeration of the solid amine because of water absorption after condensation, which reduces the mass transfer rate and heat transfer performance of the material, making the energy consumption of adsorbent regeneration high. In addition, water vapor will also bring out part of the organic amines in the process of high-temperature desorption, resulting in reduced recycling efficiency of the solid amine.

Therefore, it is significant to exploit a solid amine material absorbing $CO_2$ in industrial flue gas.

SUMMARY

In view of this, the application provides a solid amine material absorbing $CO_2$ with good water resistance and $CO_2$ adsorption effect, preparation method and application thereof.

In order to achieve the above technical purposes, the following technical solutions are adopted in the application:

First, the application provides a solid amine material absorbing $CO_2$, including a porous carrier and water-resistant organic amine loaded on the porous carrier. The water-resistant organic amine comprises a biomass-derived polyhydroxyl compound, hydrophilic organic amine and hydrophobic organic amine combined with the biomass-derived polyhydroxyl compound at the same time. The biomass-derived polyhydroxyl compound comprises a six-membered ring structure. The solid amine material absorbing $CO_2$ is a water-resistant solid amine adsorbent.

Secondly, the application provides a method for preparing a solid amine material absorbing $CO_2$, including the following steps:

S1. Dispersing the hydrophilic organic amine and the porous carrier in the organic solution, then mixing, heating, and stirring to obtain a solid amine adsorbent;

S2. Under an inert atmosphere, mixing the organic solution of the biomass-derived polyhydroxyl compound with the solid amine adsorbent, and performing reduced pressure distillation and vacuum drying to obtain the modified solid amine adsorbent;

S3. Under an inert atmosphere, mixing the modified solid amine adsorbent with an organic solution of the hydrophobic organic amine, and then performing reduced pressure distillation and vacuum drying to obtain the solid amine material absorbing $CO_2$.

2. Preferably, the hydrophilic organic amine comprises one or more of ethylenediamine, hexamethylene diamine, diethylenetriamine, triethylenetetramine, tetraethylenepentamine, pentaethylenehexamine, and branched-chain polyethyleneimine.

Preferably, the porous carrier comprises one or more of silicon oxide, alumina oxide, magnesium oxide, molecular sieve, and ion exchange resin.

Preferably, the biomass-derived polyhydroxyl compound comprises one or more of tannic acids and phytic acids.

Preferably, the hydrophobic organic amine comprises one or more of dicyclohexylamine, p-phenylenediamine, n-phenylethanolamine, linear-chain polypropylenimine, and phosphatidyl ethanolamine.

Preferably, the mass ratio of the hydrophobic organic amine to hydrophilic organic amine is (1-4):10.

Preferably, the mass ratio of the biomass-derived polyhydroxyl compound to the hydrophilic organic amine is (0.5-10):100.

Preferably, the mass ratio of the porous carrier to the hydrophilic organic amine is 9:(1-11).

Third, the application provides the application of a solid amine material absorbing $CO_2$ in industrial flue gas.

The beneficial effects of the application are as follows:

In the application, the biomass-derived polyhydroxyl compound could not only form hydrogen bonds with water-soluble organic amine, but also promote the anchoring of the hydrophobic organic amine in the carrier through bridging, thereby inhibiting the contact probability between water molecules and the active sites of hydrophilic amine groups, avoiding the physical deactivation of the solid amine caused by water molecules carrying out hydrophilic organic amine during high-temperature desorption, and improving the cyclic stability of the solid amine material;

The hydrophobic organic amine and hydrophilic organic amine can be mixed well and in contact in porous channels, which can play a good role in water resistance, and also provide active sites for $CO_2$ adsorption and increase $CO_2$ adsorption capacity;

The solid amine material absorbing $CO_2$ in the application has good water resistance, and the water absorption rate does not exceed 40% under the conditions of 35° C. and a relative humidity of 60%.

BRIEF DESCRIPTION OF THE DRAWINGS

FIG. 1 is the process flow chart of this scheme.

DESCRIPTION OF EMBODIMENTS

To make the objectives, technical solutions and advantages of the embodiments of the present disclosure clearer, a detailed description of the present disclosure will be further given below, in combination with the embodiments. It should be understood that the specific embodiments described herein are intended only to explain and are not intended to the present disclosure but not to limit the present disclosure.

The application provides a solid amine material absorbing $CO_2$, including a porous carrier and water-resistant organic amine loaded on the porous carrier. The water-resistant organic amine comprises a biomass-derived polyhydroxyl compound, hydrophilic organic amine and hydrophobic organic amine combined with the biomass-derived polyhydroxyl compound at the same time. The biomass-derived polyhydroxyl compound comprises a six-membered ring structure.

According to the theory of polymer kinetics, polymers with different conformations (such as linear-chain and branched-chain, hydrophilic and hydrophilic polymers) could not be mixed and in contact well in the adsorbent carrier channel, and the two are even isolated from each other, and cannot play a good role in water resistance. The application avoids the use of environmentally-unfriendly epoxy alkane; the provided biomass-derived polyhydroxyl compound could not only form hydrogen bonds with water-soluble organic amine, but also promote the anchoring of the hydrophobic organic amine in the carrier through bridging, thereby inhibiting the contact probability between water molecules and the active sites of hydrophilic amine groups, avoiding the physical deactivation of the solid amine caused by water molecules carrying out the hydrophilic organic amine during high-temperature desorption, and improving the cyclic stability of the solid amine material; The provided solid amine adsorbent has multiple active sites for $CO_2$ adsorption, excellent $CO_2$ adsorbability, and water resistance. The hydrophobic organic amine provides both hydrophobic groups and amine group adsorption sites, but the increased adsorption effect is not too high; The adsorption effect of the directly loaded hydrophobic organic amine is not as good as that of the hydrophilic organic amine, and cannot meet the industrial demand. The loaded hydrophilic organic amine does not have water resistance after being modified by the biomass-derived polyhydroxyl. Therefore, both the hydrophilic organic amine and the hydrophobic organic amine should be loaded in the porous carrier to complement each other.

As shown in FIG. 1, the application provides a method for preparing a solid amine material absorbing $CO_2$, including the following steps:
  S1. Dispersing the hydrophilic organic amine and the porous carrier in the organic solution, then mixing, heating, and stirring to obtain a solid amine adsorbent;
  S2. Under an inert atmosphere, mixing the organic solution of the biomass-derived polyhydroxyl compound with the solid amine adsorbent, and performing reduced pressure distillation and vacuum drying to obtain the modified solid amine adsorbent;
  S3. Under an inert atmosphere, mixing the modified solid amine adsorbent with an organic solution of the hydrophobic organic amine, and then performing reduced pressure distillation and vacuum drying to obtain the solid amine material absorbing $CO_2$; The solid amine material absorbing $CO_2$ is the water-resistant solid amine adsorbent shown in FIG. 1.

The preparation method of the application can improve the water resistance of the material by inhibiting the contact between the hydrophilic organic amine and water molecules, which has strict sequence control requirements; Otherwise, the water resistance and $CO_2$ adsorption cannot be improved; The application uses bridging of the polyhydroxyl compound and organic amine through hydrogen bonding, so that the two organic amines are not tightly filled in the carrier pore, which is more conducive to rapid adsorption. Compared with the solid amine modified by the biomass-derived polyhydroxyl compound (product of S1), the hydrophilic solid amine modified by the polyhydroxyl compound (product of S3) has a higher $CO_2$ adsorption capacity and amine utilization efficiency. The biomass-derived polyhydroxyl compound and the hydrophilic organic amine interact with each other through the hydrogen bond, which promotes the dispersion of the hydrophilic organic amine and reduces the adsorption energy consumption, so that the optimal adsorption temperature decreases from 75° C. to 65° C.

The hydrophilic organic amine comprises one or more of ethylenediamine, hexamethylene diamine, diethylenetriamine, triethylenetetramine, tetraethylenepentamine, pentaethylenehexamine, and branched-chain polyethyleneimine; The hydrophilic organic amine of the application contains the primary amine and the secondary amine groups, and the spacing between adjacent amine groups is short. The hydrophilic organic amine of the application has good water solubility, strong electron-donating ability, and good adsorption activity for $CO_2$. The concentration of the hydrophilic organic amine is 5 g/L~30 g/L.

The porous carrier includes one or more of silicon oxide, alumina oxide, magnesium oxide, molecular sieve, and ion exchange resin; The porous carrier may be powdery, granular, and have a hierarchical structure, such as the mesopore and/or macropore. The concentration of the porous carrier is 20 g/L~200 g/L.

The biomass-derived polyhydroxyl compound comprises one or more of tannic acid and phytic acid; It is a natural biomass derivative with a benzene ring or six-membered ring structure, has a strong electron absorption ability, and can be combined with the hydrophilic organic amine through some specific forces (such as hydrogen bonding and electrostatic interaction); The concentration of the biomass-derived polyhydroxyl compound is 0.2 g/L~5 g/L.

The hydrophobic organic amine comprises one or more of dicyclohexylamine, p-phenylenediamine, n-phenylethanolamine, linear-chain polypropylenimine, and phosphatidyl ethanolamine; The hydrophobic organic amine of the application is characterized by a strong hydrophobic (cyclic) alkyl or phenyl ring group, and the amine group has a certain ability to supply electrons; The molecular structure of the hydrophobic organic amine is composed of hydrophobic groups at both ends or a long chain hydrophobic alkane in the middle, and the spacing between adjacent amine groups in the amino-compound is long; The concentration of the prepared hydrophobic organic amine is 1 g/L~10 g/L, and the loading rate of hydrophobic organic amine in the adsorbent of the solid amine material absorbing $CO_2$ is 5%~15% (based on the 100% total mass of the adsorbing material).

The mass ratio of the hydrophobic organic amine to hydrophilic organic amine is (1-4):10. The hydrophilic/hydrophilic organic amine with an appropriate proportion can improve the water resistance and adsorption capacity of the material. Too low a proportion cannot play the effect of water resistance, and too high a proportion shows no significant increase in the adsorption capacity of the material. From an economic point of view, (1-4):10 is a better ratio.

The mass ratio of the biomass-derived polyhydroxyl compound to the hydrophilic organic amine is (0.5-10):100. When the ratio is lower than this range, the amount of the biomass-derived polyhydroxyl compound is small, only a small part of the hydrophilic organic amine is modified, and the load on the hydrophilic organic amine is also reduced, and the water resistance of the prepared material is not significantly improved. In case of a higher ratio, the introduction of excessive biomass-derived hydroxyl compounds will lead to the blockage of the carrier pores, thus preventing the contact between $CO_2$ and the active amine functional group and reducing the adsorption rate.

The mass ratio of the porous carrier to the hydrophilic organic amine is 9:(1-11). In case of a higher ratio range, the adsorption effect is poor; In case of a lower ratio range, the hydrophilic organic amine overload causes carrier pore blockage, and the active site cannot be well exposed and in contact with $CO_2$, lowering its adsorbability. In addition, a high hydrophilic organic amine load can also lead to a high economic cost of the adsorbent.

Third, the application provides an application of solid amine material absorbing $CO_2$ in $CO_2$ adsorption of industrial flue gas, wherein the application steps comprise placing the solid amine material absorbing $CO_2$ in a quartz tube for the adsorption of $CO_2$ in a $CO_2$ flow of 10 VOL % under the condition of 30° C.~90° C.

This scheme is further described by the specific embodiments below.

Embodiment 1

A solid amine material absorbing $CO_2$, including a porous carrier and water-resistant organic amine loaded on the porous carrier. The water-resistant organic amine comprises a biomass-derived polyhydroxyl compound, hydrophilic organic amine and hydrophobic organic amine combined with the biomass-derived polyhydroxyl compound at the same time. The biomass-derived polyhydroxyl compound comprises a six-membered ring structure.

The method for preparing the solid amine material absorbing $CO_2$ is as follows:

S1. Dissolving 0.66 parts by mass of polyethyleneimine in 20 parts by volume of methanol and stirring at room temperature for 30 minutes to obtain transparent solution I; After washing 1 part by mass of ethanol and drying it under 110° C. vacuum for 2 hours, dispersing the porous $SiO_2$ in 5 parts by volume of methanol solution, and mixing it with the transparent solution I obtained in step S1 at a volume ratio of 1:4, stirring it under 60° C. until evaporating all the solvent, and drying at 80° C. vacuum for 8 hours to obtain solid amine adsorbent;

S2. Dissolving 0.1 parts by mass of tannic acid in 20 parts by volume of ethanol solution, and stirring in Ar atmosphere for 30 minutes to obtain a uniform transparent solution II; Mixing the solid amine adsorbent obtained in step S1 with the transparent solution II obtained in step S2 at a mass/volume ratio of 1.66:20, stirring in Ar atmosphere at a rotational speed of 500 rpm for 12 hours, then performing vacuum distillation and vacuum drying to obtain the modified solid amine adsorbent;

S3. Dissolving 0.2 parts by mass of linear-chain polypropylenimine in 20 parts by volume of methanol solution, stirring at 500 rpm under ambient temperature for 15 minutes to obtain a uniform transparent solution III; Evenly mixing the solid amine adsorbent obtained in step S2 with the polypropylenimine solution at a mass/volume ratio of 1.76:20, stirring in Ar atmosphere at ambient temperature at a rotational speed of 300 rpm for 12 hours, performing vacuum distillation at 50° C. until all solvent evaporated, and drying it at 60° C. for 12 hours to obtain the solid amine material absorbing $CO_2$.

Embodiment 2

A solid amine material absorbing $CO_2$, wherein the other contents are the same as Embodiment 1, except that the parts by mass of the hydrophobic organic amine are 0.07; The parts by mass of biomass polyhydroxyl compounds are 3.3% %; The part by mass of the porous carrier is 6.7.

Embodiment 3

A solid amine material absorbing $CO_2$, wherein the other contents are the same as Embodiment 1, except that the parts by mass of the hydrophobic organic amine are 0.26; The parts by mass of the biomass-derived polyhydroxyl compound are 0.07; The parts by mass of the porous carrier is 0.81.

Comparative Example 1

A solid amine adsorbent, wherein the other contents are the same as Embodiment 1, except that steps S2 and S3 are not included.

Comparative Example 2

A solid amine adsorbent, wherein the other contents are the same as Embodiment 1, except that step S3 is not included.

Comparative Example 3

A solid amine adsorbent, wherein the other contents are the same as Embodiment 1, except that step S2 is not included.

Comparative Example 4

A solid amine adsorbent, wherein the other contents are the same as Embodiment 1, except that the carrier is modified with the polyhydroxyphenol, and then loaded with hydrophilic and hydrophilic organic amines, that is, steps S2, S1 and S3 are carried out first.

Comparative Example 5

A solid amine adsorbent, wherein the other contents are the same as Embodiment 1, except that the two amines are loaded, and then modification is made by adding the polyhydroxyphenol, that is, first steps S1 and S3 are carried out first before S2.

Comparative Example 6

A solid amine adsorbent, wherein the other contents are the same as Embodiment 1, except that the hydrophilic organic amine is first loaded, then modification is made with the polyhydroxyphenol, and finally, the hydrophilic organic amine is loaded, that is, steps S3 and S2 are carried out first before S1.

Evaluation Test

The water resistance and $CO_2$ adsorbability of embodiments 1-3 and comparative examples 1-6 are tested:

$CO_2$ adsorbability test: The solid amine material absorbing $CO_2$ is placed in a quartz tube for adsorption of $CO_2$ in a $CO_2$ gas flow of 10 VOL % at 65° C. and 75° C.;

Water resistance test: The sample of the solid amine material absorbing $CO_2$ is pretreated for 2 hours in $N_2$ air flow at 110° C., and then equilibrated for 10 minutes after the temperature dropped to 35° C. Under a humidity of 60%, the sample is kept isothermal for more than 1 hour until the percentage change of adsorbent weight was <0.005; The results are shown in Table 1.

TABLE 1

Test Results

| Item | Adsorption capability (mg/g) under 65° C. | Adsorption capability (mg/g) under 75° C. | Water absorption (%) |
| --- | --- | --- | --- |
| Embodiment 1 | 126.5 | 113.2 | 18.8 |
| Embodiment 2 | 37.1 | 39.6 | 46.1 |
| Embodiment 3 | 122.7 | 113.4 | 20.0 |
| Comparative example 1 | 103.2 | 106.9 | 71.3 |
| Comparative example 2 | 110.7 | 97.8 | 69.7 |
| Comparative example 3 | 107.6 | 109.1 | 37.4 |
| Comparative example 4 | 104.2 | 105.9 | 45.5 |
| Comparative example 5 | 96.2 | 91.3 | 64.3 |
| Comparative example 6 | 98.8 | 101.4 | 63.2 |

It can be seen from embodiments 1-3 that the loading of the hydrophilic organic amine affects their $CO_2$ adsorption capacity, and the loading of the hydrophilic organic amine and polyhydroxyl compound affects their water absorption. For only the hydrophilic organic amine loaded in comparative example 1, the adsorption capacity is not high, and the water absorption rate is as high as 71.3%, which is mainly due to the water absorption of the hydrophilic organic amine. The hydrophilic organic amine is modified by adding polyhydroxyl compounds in comparative example 2, and the introduction of the hydroxyl group reduces the alkalinity of the organic amine and the adsorption energy of the adsorbent. Therefore, the adsorption capacity of the sample obtained by comparative example 2 at 65° C. is higher than that at 75° C., but the water absorption is still high because no hydrophilic functional group is introduced. Both the hydrophilic and hydrophobic organic amines are loaded at the same time in comparative example 3; Despite the introduction of hydrophobic groups, the hydrophobic organic amine lacks the bridging effect with the hydrophilic organic amine, and the water absorption rate is 37.4%. Compared with comparative example 1 and comparative example 2, the introduction of the hydrophilic organic amine also increases the adsorption capacity of the adsorbent at 75° C.

In comparative example 4, the carrier is modified with polyhydroxyphenol, and then loaded with hydrophilic and hydrophilic organic amines. Although the polyhydroxyphenol can be bonded with two organic amines through hydrogen bonding, the hydrophilic organic amine may be disordered packed in the outermost layer of pore wall, and this process cannot well inhibit the contact between water molecules and the hydrophilic organic amine. In comparative example 5, two amines are loaded and modification is made by adding polyhydroxyphenol. When loading organic amines first may lead to the isolation of the two amines, polyhydroxyphenol is difficult to effectively bridge the two organic amines, and more grafting modification is made on the outer surface of the organic amine, which cannot play a good water resistance effect. In comparative example 6, the carrier is modified with polyhydroxyphenol, and then loaded with hydrophilic and hydrophilic organic amine. The hydrophilic organic amine is at the surface of the carrier pore wall and is easy to contact with water molecules; This process is not conducive to improving the water resistance of the material.

The above is only preferred specific embodiments of the present disclosure, but the scope of protection of the present disclosure is not limited thereto, and any change or replacement that can be easily conceived by those skilled in the art within the technical scope of the present disclosure disclosed should also fall within the scope of protection of the present disclosure.

The invention claimed is:

1. A method for preparing a solid amine material, wherein the solid amine material includes a porous carrier and water-resistant organic amine loaded in the porous carrier; the water-resistant organic amine comprises a biomass-derived polyhydroxyl compound, hydrophilic organic amine and hydrophobic organic amine combined with the biomass-derived polyhydroxyl compound at the same time; the biomass-derived polyhydroxyl compound comprises a six-membered ring structure; the biomass-derived polyhydroxyl compound comprises one or more of tannic acid and phytic acid; the hydrophobic organic amine comprises one or more of dicyclohexylamine, p-phenylenediamine, n-phenylethanolamine and linear-chain polypropylenimine; the parts by mass, of the components, in the solid amine material is as follows: 1 part by mass of porous carrier, 0.2 parts of hydrophobic organic amine, 0.66 parts by mass of hydrophilic organic amine, and 0.1 parts by mass of biomass-derived polyhydroxyl compound; the method for preparing the solid amine material, including the following steps:
   S1. dispersing the hydrophilic organic amine and the porous carrier in an organic solution, then mixing, heating, and stirring to obtain an solid amine adsorbent;
   S2. under an inert atmosphere, mixing the organic solution of the biomass-derived polyhydroxyl compound with the adsorbent, and performing reduced pressure distillation and vacuum drying to obtain a modified adsorbent; and
   S3. under an inert atmosphere, mixing the modified adsorbent with an organic solution of the hydrophobic organic amine, and then performing reduced pressure distillation and vacuum drying to obtain the solid amine material.

2. The method for preparing the solid amine material according to claim 1, wherein the hydrophilic organic amine comprises one or more of ethylenediamine, hexamethylene diamine, diethylenetriamine, triethylenetetramine, tetraethylenepentamine, pentaethylenehexamine, and branched-chain polyethyleneimine.

3. The method for preparing the solid amine material according to claim 1, wherein the porous carrier comprises one or more of silicon oxide, alumina oxide, magnesium oxide, molecular sieve, and ion exchange resin.

* * * * *